'United States Patent Office 3,301,052
Patented Jan. 31, 1967

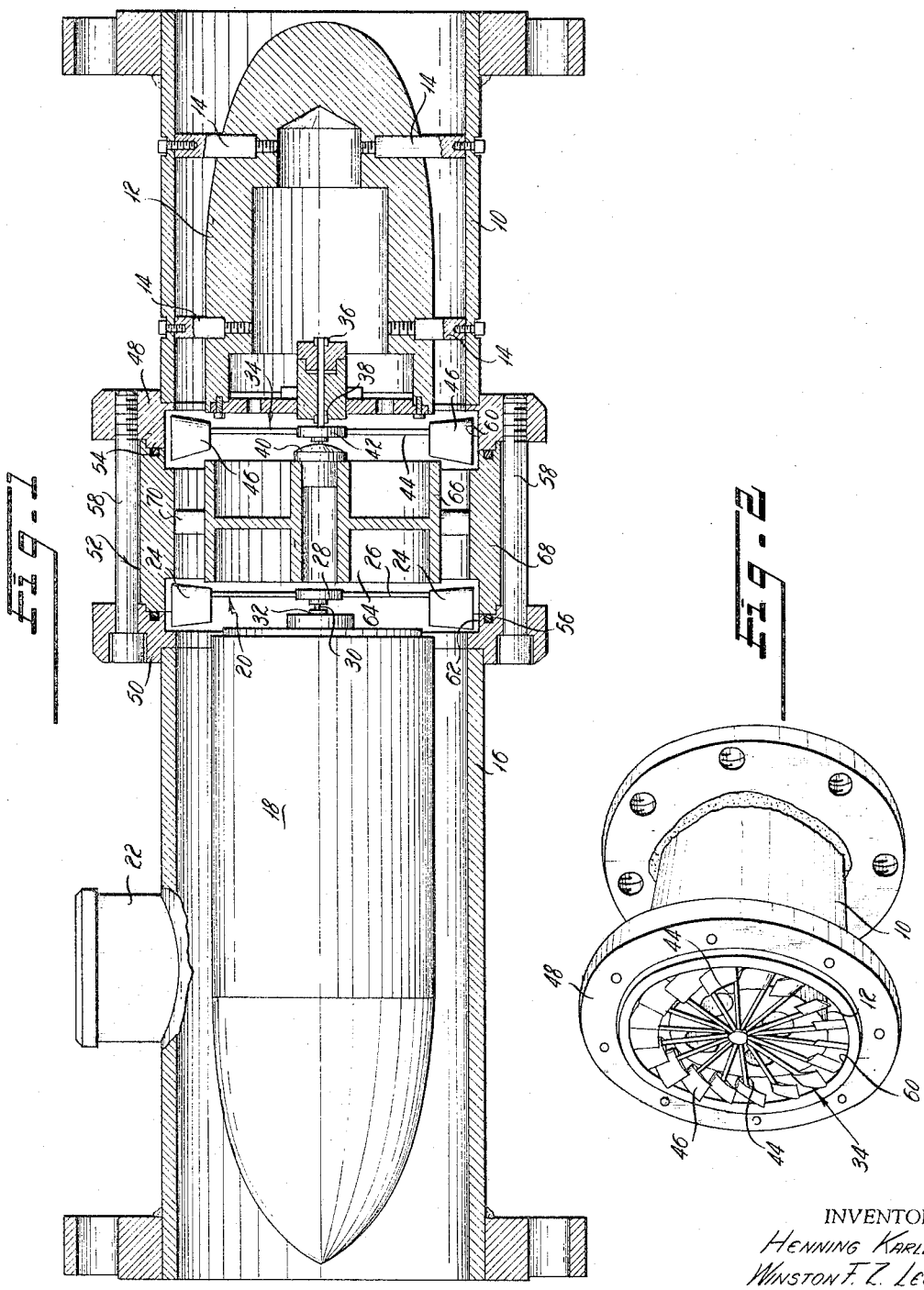

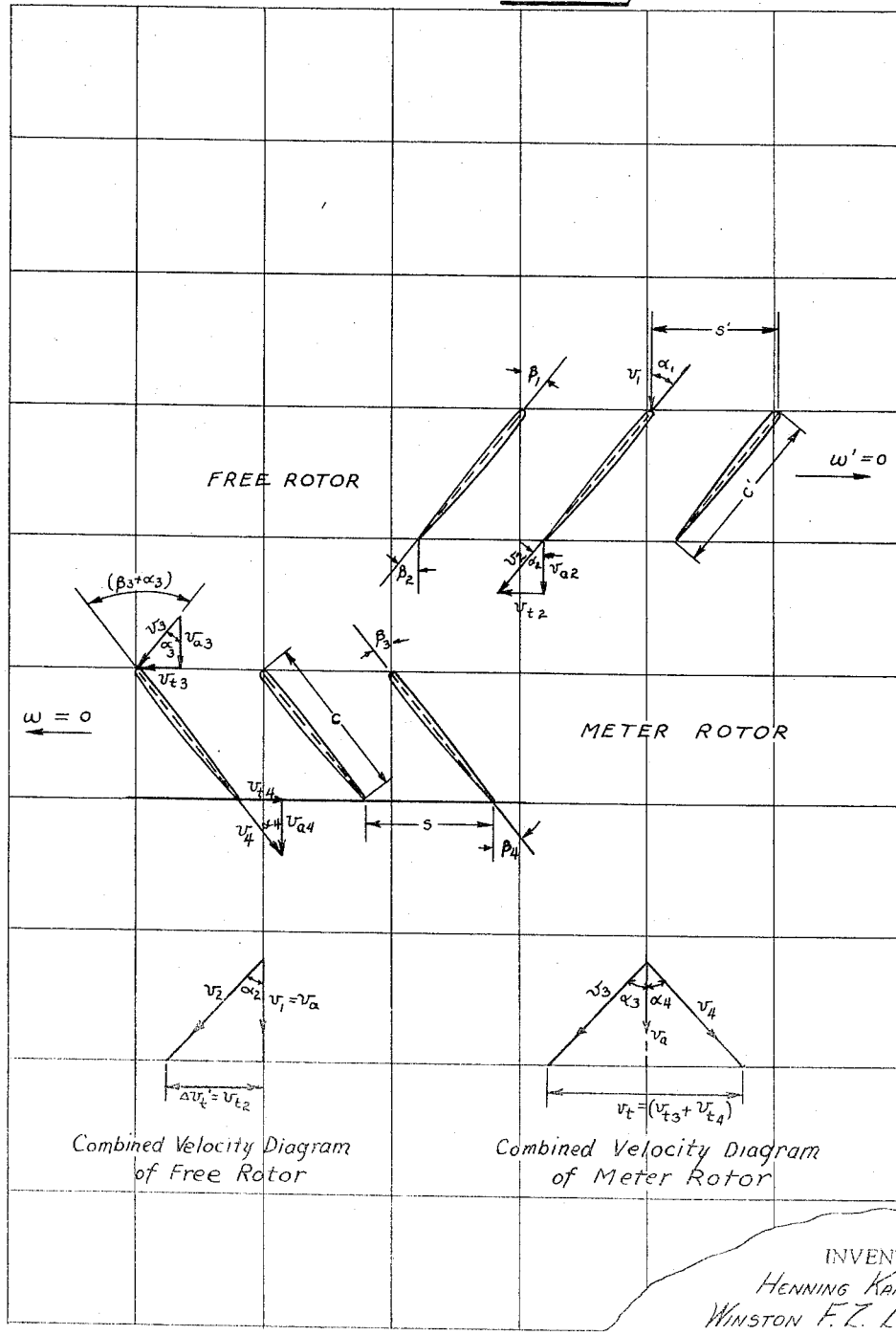

3,301,052
TURBINE FLOWMETER
Winston F. Z. Lee, 446 Grove Road, Verona, Pa. 15147, and Henning Karlby, Fox Chapel Road, Pittsburgh, Pa. 15238
Continuation of application Ser. No. 717,922, Feb. 7, 1958. This application Nov. 15, 1965, Ser. No. 509,680
11 Claims. (Cl. 73—231)

This is a continuation of our pending application Serial No. 717,922 filed February 27, 1958 for Meter.

The present invention relates to turbine meters and more particularly to improvements in such meters which render them substantially free of metering inaccuracies resulting from the viscosity effect of fluid of high viscosity.

An example of a preferred form of turbine meter is described in our now abandoned application Serial No. 717,863 filed on Feb. 27, 1958.

It has been established theoretically and experimentally that the meter disclosed in said application is satisfactory for high accuracy measurement of fluids of low viscosity such as air, gases, water, gasoline, fuel oils, etc., but that without proper modification, it does not have much chance of meeting extremely high accuracy requirement such as ±0.1% allowable deviation over a flow range ($Q_{max}/Q_{min}$ of 5) for high viscosity fluids such as crude oils of high viscosity ranges from a minimum of 35 S.U.S. to a maximum of 5000 S.U.S. as required commercially, particularly where fluids of different viscosities must be metered by the same meter. The main trouble is due to the fact that in turbine meters of that type, the driving torque is proportional to the square of flow ($Q^2$) whereas the resisting torque (Tr) is proportional to an exponential power of flow (Q) less than square since the viscous drag which makes up the major part of the total resisting torque is linearly proportional to flow. Consequently, the accuracy curve of a turbine meter of that type will have a hump in crude oil of high viscosity for flows within the operating range instead of a flat curve as in fluid of low viscosity. It is therefore necessary to introduce some special device into a turbine meter of that type to eliminate the viscosity effect of fluid of high viscosity on the meter accuracy.

The primary object of the present invention is to provide an improved axial flow turbine meter embodying a free spinning counter rotating rotor disposed coaxial with and at a proper distance upstream of the register driving metering rotor, the effect of which is to provide a high output torque of the meter rotor and to substantially eliminate metering registration inaccuracies attributable to the viscosity of the fluid being metered.

More specifically, it is an object of this invention to provide an axial flow turbine meter embodying a free spinning counter rotating rotor disposed coaxial with and at a proper distance upstream of the meter rotor and in which the blade angle of the blades of the free rotor is so correlated to the blade angle of the blades of the meter rotor that the absolute exit velocity of fluid from the metering rotor is substantially free of any tangential component regardless of the different viscosities of different fluids.

A further specific object of this invention is to provide an axial flow turbine meter embodying a free spinning counter rotating rotor disposed coaxial with and at a proper distance upstream of the meter rotor and in which the free rotor is effective to impart a tangential component to the absolute exit velocity of fluid passing therethrough which is substantially equal and opposite to the change in the tangential component of the velocity of the fluid as it passes through the meter rotor.

These and other objects of the present invention will become more fully apparent by reference to the appended claims and as the following detailed description proceeds in reference to the accompanying drawings wherein:

FIGURE 1 is a longitudinal sectional view through a turbine meter embodying the present invention;

FIGURE 2 is a perspective view of the upstream end section of the meter of FIGURE 1 showing the free spinning counter rotating rotor;

FIGURE 3 is a diagram illustrating the starting condition of the meter of FIGURE 1.

Figure 4:
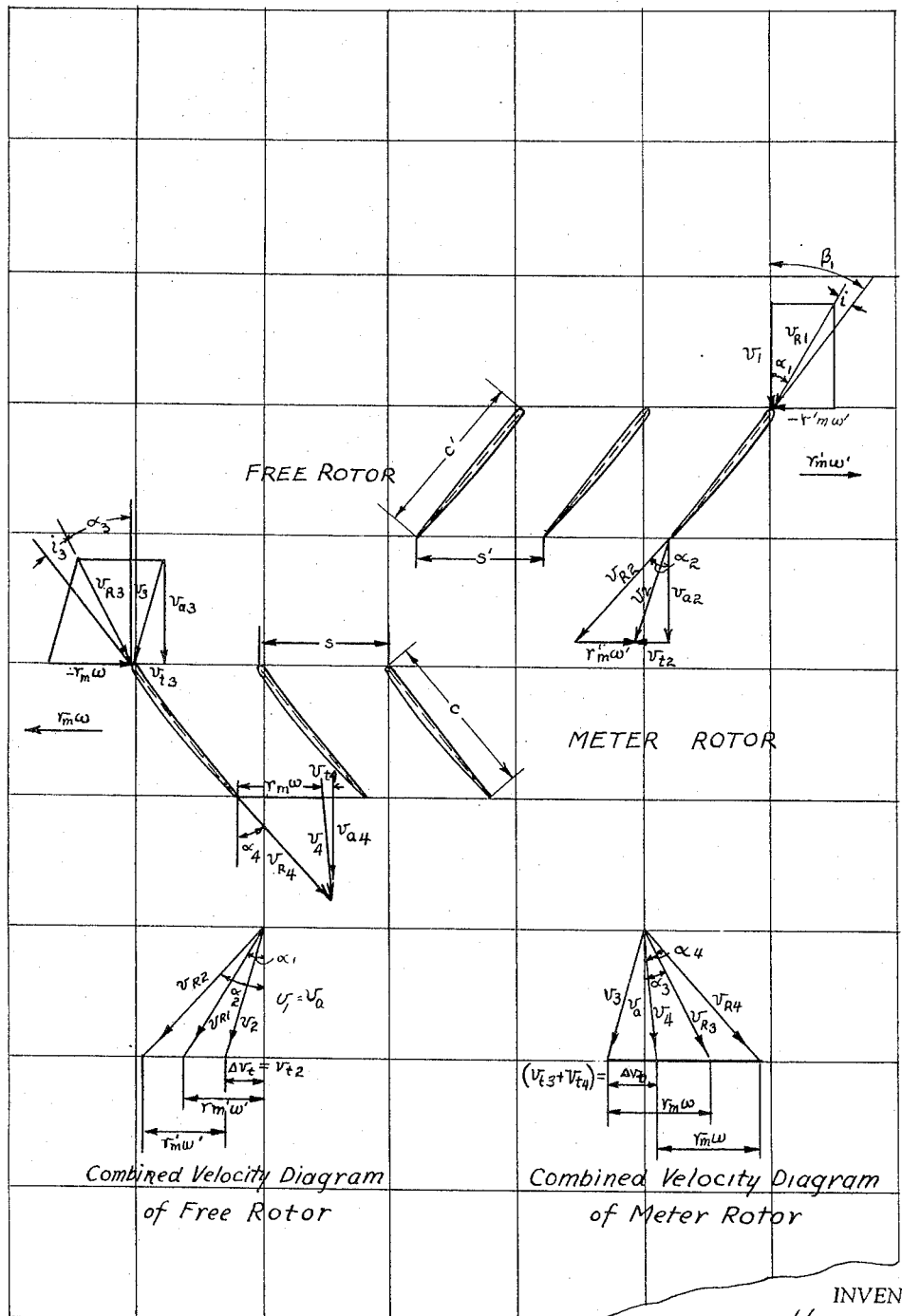
FIGURE 4 is a diagram illustrating the synchronous speed condition of the meter of FIGURE 1.

Referring to FIGURE 1, the axial flow turbine meter therein shown comprises a cylindrical inlet conduit section 10 having a faired core section 12 supported coaxially therein by spaced struts 14, and an outlet conduit section 16 having a faired core section 18 supported coaxially therein by equiangularly spaced longitudinally extending ribs (not shown). Core section 18 journals a meter turbine rotor 20 and contains a drive train to a register within register housing 22 all of which, with the exceptions explained below, is of identical structure to the structure shown in our said copending application, the disclosure of which is hereby adopted and incorporated herein by reference and thus requires no further detailed disclosure or explanation herein.

The exceptions referred to, which result from the fact that the axial direction of flow through the meter of this application is opposite from that shown in said application, are (1) that the rotor 20 is turned around, that is, as compared with the rotor of said application, rotated 180° about an axis of any one of the radiating spokes 26, and (2) that the shaft 30 on which the hub 28 of the rotor 20 is mounted is extended sufficiently to provide a clearance between the blades 24 and the adjacent end of core section 18.

A free spinning counter rotating rotor 34 is journalled within core section 12 coaxial therewith and with rotor 20 by spaced radial sapphire bearings 36 and 38, and is resiliently axially restrained against downstream movement by a resiliently backed sapphire thrust bearing carried by support 40.

Rotor 34 is generally similar in construction to rotor 20, having a hub 42 from which radiate equiangularly spaced spokes 44, each supporting a blade 46 at its outer end. The relation between the blade angle of blades 46 and the blades 24 is as will be explained hereinafter in detail in reference to FIGURES 3 and 4. That is, the blade angle of blades 46 is approximately equal and opposite to the blade angle for blades 24 relative to the common rotation axis for rotors 34 and 20. The rotors 20 and 34 thus rotate in opposite directions at close speeds.

Angular members 48 and 50 are welded respectively to the adjacent ends of conduit sections 10 and 16, are maintained in fixed axially spaced and axially aligned relation by piloting engagement with an annular spacer 52 interposed therebetween and maintained in fluid tight relationship therewith by recessed O-ring type gaskets 54 and 56, and are fixed together by connecting equiangularly spaced machine screws 58. Members 48, 50 and 52 define internal annular recesses 60 and 62 proportioned and formed to receive the outer ends of blades 46 and 24 and form turbulent seals about the periphery of the turbine blades 46 and 24 respectively to prevent leakage of fluid to be metered around the rotors 34 and 20 without passing through the blades thereof. Spacer 52 has an integral concentric hub 64 having an outside diameter at its periphery 66 equal to the outside diameter of the cylindrical portions of core sections 12 and 18 and supported coaxially therewith from the outer rim 68 by a plurality (three in the preferred construction) of equiangularly spaced radial spokes 70.

Spokes 70 are of such size and number that they have no material effect on the fluid flow pattern between rotors 34 and 20.

The spacing between the free rotor 34 and meter rotor 20 is important in determining the overall performance of the turbine meter. The spacing should be short enough so that the tangential component of the fluid exit velocity from the free rotor is not significantly reduced by the fluid friction when passing through the spacing. However, it should be long enough so that the effect of the disturbance created upstream by the presence of the counter rotating free rotor is small when it reaches the meter rotor. Experimental results indicate that this spacing should be at least twice that of the chord length $C^1$ of the free rotor blades.

In the FIGURE 1 and 2 embodiment of the invention, rotor 34 is free of any load other than the fluid friction and the friction load of the bearings 36 and 38. The tangential component of the absolute fluid exit velocity from rotor 34 will be a function of the viscosity of the fluid being metered. This tangential component will, as the fluid to be metered enters the meter rotor 20, apply a supplemental driving torque to meter rotor 20 proportional to the viscosity of the fluid being metered. This supplemental driving torque is ideally exactly equal and opposite to the total resisting torque acting on the meter rotor 20 so that the absolute fluid exit angle and tangential component of the absolute exit velocity of the fluid from the blades of rotor 20 are zero under ideal conditions. In practice this ideal condition is not achieved but the provision of the free counter rotating rotor 34, except on the metering of extremely viscous fluids, reduces the discrepancy of registration attributable to the viscosity effect of the fluid to the point where this discrepancy is negligible as will now be fully explained in detail.

As shown in FIGURES 3 and 4, a free spinning counter rotating rotor (henceforth called "free rotor") is added at a proper distance in front of the meter rotor. Structurally, the free rotor is similar to the meter rotor except that the blades of the fomer are slanted to the opposite direction from the latter. Analysis shows that the accuracy of the turbine meter is effected only by the difference of the resisting moments due to viscous friction acting on the meter rotor $T_v$ and on the free rotor $T'_v$ whereas the accuracy of a turbine meter without the free rotor is effected by the absolute magnitude of the resisting moment due to viscous friction acting on the meter rotor $T_v$. In fluid of high viscosity, although the absolute magnitude of the resisting moment due to viscous drag $T_v$ has to be large, the difference of the resisting moments due to viscous drag $(T_v - T'_v)$ can be made small for all flows within its operating range by proper design of the free rotor to match the meter rotor in resisting moments due to viscous drag (i.e., $T'_v \approx T_v$). This can be accomplished by controlling those parameters which determine the amount of viscous friction. When this is fulfilled (i.e. $T'_v \approx T_v$), the accuracy of the turbine meter is substantially independent of the viscosity of the fluid.

Analysis also shows that the insertion of the free rotor in front of the meter rotor doubles the driving torque of the turbine meter during starting, thus lowering the minimum flow rate and increasing the usable flow range. On the other hand, the addition of the free rotor doubles the head loss across the blades as well as increasing the length and the cost of the turbine meter. For fluids of low viscosity, where the free rotor is superfluous or even undesirable, the turbine meter as disclosed in said copending application is preferred.

The notations used in the following analysis (all angles will be measured from the axial direction), are:

$D_o$, $r_o$ = diameter, radius of the turbine housing
$D_i$, $r_i$ = diameter, radius of the inlet core 12 FIGURE 1
$D_m$, $r_m$ = mean diameter, mean radius of the turbine rotor, defined $$D_m = \frac{\sqrt{D_o^2 + D_i^2}}{2}, \quad r_m = \frac{\sqrt{r_o^2 + r_i^2}}{2}$$

$A_a$ = annular flow cross section = $\pi(r_o^2 - r_i^2)$
$s$ = pitch of the blades
$c$ = chord length of the blades
$\beta_1$, $\beta_3$ = blade inlet angle
$\beta_2$, $\beta_4$ = blade outlet angle
$a_1$, $a_3$ = fluid inlet angle
$a_2$, $a_4$ = fluid outlet angle
$v$ = absolute velocity
$v_t$ = tangential component of the absolute velocity
$\omega$ = angular velocity of the turbine meter
$\tan^m \beta_2$ = tangent of the blade outlet angle $\beta_2$ at mean radius $r^m$ of the motor
$Q$ = volume rate of flow through the turbine meter
$Q_{min.}$ = minimum rate of flow of the operating flow range of the turbine meter
$Q_{max.}$ = rated flow capacity of the turbine meter
$\rho$ = mass density of the fluid when passing through the turbine rotor
$T_d$ = driving torque on the turbine rotor due to the flow of fluid
$T_r$ = total resisting torque exerted on the turbine rotor assembly
$T_m$ = resisting torque due to total mechanical friction exerted on the rotor assembly
$T_v$ = resisting torque due to viscous friction exerted on the rotor assembly
$T_t$ = resisting torque due to turbulent friction exerted on the rotor assembly Referring to FIGURES 3 and 4, the blades of the free rotor are taken as the mirror images of those of the meter rotor for the sake of simplicity in analytical treatment, although they can differ in actual design. Then $$\beta_1 = \beta_3$$
$$\beta_2 = \beta_4$$
$$r_m = r'_m$$
$$c = c'$$
$$s = s'$$

Symbols with primes refer to the free rotor while those without refer to the meter rotor.

A. *Starting condition (Figure 3)*

For small flow Q so that $\omega = \omega' = 0$
Driving torque $T'_d$ on the free rotor is given by equation $$T'_d = \frac{r_m}{A_a} \tan^m \beta_2 \, \rho Q^2$$

Driving toque $T_d$ on the meter rotor $$T_d = r_m \rho Q (\Delta v_t) = r_m \rho Q (^m v_{t3} + ^m v_{t4}) =$$
$$\frac{r_m}{A_a} \rho Q^2 (\tan {}^m a_3 + \tan {}^m a_4)$$

But $$^m a_4 {}^m \beta_4 = {}^m \beta_2$$

and the loss of tangential component $(v_{t2} = v_{t3})$ of the fluid velocity from the exit of the free rotor to the inlet of the rotor can be neglected; namely, $v_{t3} v_{t3}$ or $\tan {}^m_{c3} \tan {}^m_{c2} \tan {}^m \beta_2$.

The driving torque $T_d$ of the meter rotor becomes $$T_d = \frac{r_m}{A_a} \cdot 2 \tan {}^m \beta_2 \rho Q^2$$

and $$\frac{T_d}{T'_d} = 2 \frac{\frac{r_m}{A_a} \tan {}^m \beta_2 \rho Q^2}{\frac{r_m}{A_a} \tan {}^m \beta_2 \rho Q^2} = 2$$

But $$T'_d = \frac{r_m}{A_a} \tan {}^m \beta_2 \rho Q^2$$

is also the driving torque of the turbine meter without the free rotor. Therefore, the driving torque of the turbine meter during starting is practically doubled with the addition of the free rotor in front of the meter rotor.

B. *Synchronous condition (Figure 4)*

Let $\omega'$ and $\omega$ be the respective angular velocities of the free rotor and meter rotor. Driving torque available Free rotor: $T'_d = r_m \rho Q v_{t2}$  (1)

Meter rotor: $T_d = r_m \rho Q (v_{t3} + v_{t4}) r_m \rho Q (v_{t2} + v_{t4})$  (2)

At synchronous condition, the driving torque equals the total resisting torque

Free rotor: $T'_d = T'_r$  (3)

$$= T'_m + T'_v + T'_t$$

Meter rotor: $T_d = T_r$ $$= T_m + T_v = T_t \quad (4)$$

From Equation (1) through Equation (4)

$$v_{t2} = \frac{T'_r}{r_m Q}$$

$$v_{t4} = \frac{T_r - T'_r}{r_m \rho Q}$$

From the velocity diagrams in FIGURE 4 it can be readily shown that

Free rotor: $\dfrac{\omega'}{Q} = \dfrac{1}{r_m A_a}\left[\tan {}^m\beta_2 - \dfrac{T'_r}{\dfrac{r_m \rho Q^2}{A_a}}\right]$ $$= \frac{1}{r_m A_a}\left[\tan {}^m\beta_2 - \left(\frac{T'_m + T'_v + T'_t}{\dfrac{r_m \rho Q^2}{A_a}}\right)\right] \quad (5)$$

Meter rotor: $\dfrac{\omega}{Q} = \dfrac{1}{r_m A_a}\left[\tan {}^m\beta_2 - \left(\dfrac{T_r - T'_r}{\dfrac{r_m \rho Q^2}{A_a}}\right)\right]$ $$= \frac{1}{r_m A_a}\left\{\tan {}^m\beta_2 - \left[\frac{(T_m - T'_m) + (T_v - T'_v) + (T_t - T'_t)}{\dfrac{r_m \rho Q^2}{A_a}}\right]\right\} \quad (6)$$

The ideal condition of a turbine meter is that the speed of the meter rotor is linear proportional to flow Q, namely $$\omega/Q = \text{constant}$$

For the turbine meter without the free rotor, the constancy of $\omega/Q$ depends substantially upon the magnitude of the viscous friction $T_v$ which is unavoidably large for fluids of very high viscosity. However, according to Equation (6) the constancy of $\omega/Q$ of the meter rotor of the turbine meter herein disclosed is determined substantially by the difference $(T_v - T'_v)$ of the viscous friction acting on the meter rotor $T_v$ as in the previous case of a turbine meter without the free rotor. For fluids of high viscosity, while the absolute magnitude of the viscous friction acting on the meter rotor $T_v$ cannot be substantially reduced, the difference between $T_v$ and $T'_v$ can be made small by proper design of the free rotor and the meter rotor.

The invention may be embodied in other specific forms without departing from the spirit of essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, means including inner and outer walls defining a rectilinear fluid flow conduit of uniform annular cross-section interrupted at spaced intervals to form axially spaced apart inwardly opening annular recesses, a pair of peripherally bladed axially spaced independently rotatable axially aligned turbine rotors having oppositely directed blade angles and having the blades thereof disposed in the path of fluid flowing through said annular conduit for movement in response to fluid flow through said conduit, the upstream one of said rotors acting to impart a supplemental driving torque on the downstream one of said rotors and the downstream one of said rotors adapted to be connected for determining the volumetric flow rate of fluid passing through said conduit, means journalling each of said rotors coaxially of said conduit with each of said rotors being radially aligned with separate ones of said recesses, the blades of said rotors extending radially across said conduit and projecting into respective ones of said recess in radially overlapping relationship to the inner and outer walls of said conduit whereby the fluid stream contacts only the blades as it passes through the turbine rotors.

2. The combination defined in claim 1 wherein said turbine rotors each embody a central hub and a plurality of spokes projecting outwardly therefrom toward the rotor periphery, said spokes providing a lightweight low inertia support for the rotor blades.

3. In a fluid meter for measuring the flow of viscous fluids, first and second independently axially aligned rotatable peripherally bladed impulse turbine rotors, means including a housing for directing fluid in an annularly cross-sectioned stream extending through the blades of said first and second rotors seriatum coaxially of the rotor rotational axes and for confining said fluid stream to contact only the blades of said rotors as it passes through said rotors, said rotors being mounted to be movable only in response to the flow of fluid therethrough, means operable to register the number of turns made by said second rotor, the blading of said second rotor having means to impart a predetermined change to the tangential velocity component of the fluid passing through the blades thereof, the blading of said first rotor having means to produce in the fluid stream leaving said first rotor a tangential velocity component which is substantially equal and opposite to said predetermined change imparted to the fluid by said second rotor, and means for journalling said first and second rotors in predetermined axially spaced apart relationship to provide for a space which is axially sufficiently short that the tangential velocity component in the fluid leaving said first rotor remains substantially the same as the fluid travels between said first and second rotors and which is sufficiently long that the disturbance created by movement of the blades of said first rotor in said fluid stream has negligible effect on the tangential velocity component of the fluid stream entering said second rotor.

4. The meter as defined in claim 3 wherein each of the blades of each of said rotors have first axially spaced apart edge surfaces defining the tip of each blade and the second axially spaced apart edge surfaces defining the root of each blade, said second edge surfaces being contained in parallel planes extending normally to the rotor rotational axis in predetermined spaced apart relationship, and said first edge surfaces being contained in parallel planes extending normally to the rotor rotational axis and being at least as closely spaced to each other as are the parallel planes containing said first edge surfaces.

5. The meter as defined in claim 3 wherein the blades of each of said rotors are formed to provide for a chordial blade length at the blade tips that is greater than the chordial blade length at the blade roots.

6. The meter as defined in claim 3 wherein the radial length of each of the blades of said rotors is at least equal to one-half the mean axial length thereof.

7. The fluid meter as defined in claim 3 wherein the blading of each of said rotors is provided with means for imparting to the fluid leaving each of said rotors a fluid angle which is substantially equal to the blade outlet angle of each of said blades.

8. The combination defined in claim 3 wherein said spacing is at least equal to twice the chord length of the upstream turbine blades.

9. In an axial flow impulse turbine meter for use in accurately measuring the volumetric quantity of flow of fluids therethrough, a housing, means defining an annular rectilinear fluid flow passageway through said housing, a peripherally bladed metering rotor mounted for rotation in a predetermined direction coaxial with said fluid flow passageway and having its blades movable only in response to fluid flow therethrough in a closed path in said passageway, a free spinning counter-rotating peripherally bladed rotor independently mounted upstream from and coaxial with said metering rotor for rotation in the opposite direction to said metering rotor and having its blades movable only in response to fluid flow therethrough in a closed path disposed in said fluid passageway in coaxial relationship with the closed path of the blading of said metering rotor, means confining the fluid stream in said passageways to contact only the blades of both of said rotors as it passes seriatum through said counter-rotating and metering rotors, the blading of said metering rotor imparting a predetermined change in the tangential velocity component of the fluid as it passes through said metering rotor, the blading of said counter-rotating rotor being identical to that of said metering rotor with the exception that the blade angle of said counter-rotating rotor is equal and opposite to that of the blades of said metering rotor to produce in the fluid stream leaving said counter-rotating rotor a tangential velocity component having a magnitude equal and opposite to said predetermined change in said tangential velocity component imparted by said metering rotor, the blading of said rotors both having means to impart an angle to the fluid leaving each rotor that is substantially equal to the blade outlet angle of each rotor, and means for journalling said counter-rotating rotor in predetermined axially spaced apart relationship to said metering rotor to provide for a space between said rotors which is axially sufficiently short that the tangential velocity component produced in the fluid stream leaving the counter-rotating rotor remains substantially of the same magnitude when it enters said metering rotor and which is sufficiently axially long that the effect of the disturbance created by rotation of said counter-rotating rotor has negligible effect on the tangential velocity component of the fluid stream as it enters the metering rotor.

10. In a fluid meter for measuring the flow of fluid, first and second axially aligned rotatable peripherally bladed impulse turbine rotors, means for directing fluid to the meter in an annular rectilinear stream seriately through the blades of said first and second rotors coaxially with the rotor rotational axes with said blades being mounted to be movable only in response to the flow of fluid therethrough, means operable to register the number of turns made by said second rotor, the blading of said second rotor having means to impart a predetermined change to the tangential velocity component of the fluid passing through the blades thereof, the blading of said first rotor having means to provide in the fluid stream leaving said first rotor a tangential velocity component which is substantially equal and opposite to said predetermined change imparted to the fluid by said second rotor, and means for journalling said first and second rotors in predetermined axially spaced apart relationship to provide for a space which is axially sufficiently short that the tangential velocity component in the fluid leaving said first rotor remains substantially the same as the fluid travels between said first and second rotors and which is sufficiently long that the disturbance created by movement of the blades of said first rotor in said fluid stream has negligible effect on the tangential velocity component of the fluid stream entering said second rotor.

11. In an axial flow impulse turbine meter for use in accurately measuring the volumetric quantity of flow of fluids therethrough, a housing, means defining an annular rectilinear fluid flow passageway through said housing, a peripherally bladed metering rotor mounted for rotation in a predetermined direction coaxial with said fluid passageway and having its blades movable only in response to fluid flow therethrough in a closed path in said passageway, a free spinning counter-rotating peripherally bladed rotor mounted upstream from and axially aligned with said metering rotor for rotation in the opposite direction to said metering rotor and having its blades movable only in response to fluid flow therethrough in a closed path disposed in said fluid passageway in axially aligned relationship with the closed path of the blading of said metering rotor, the blading of said metering rotor imparting a predetermined change in the tangential velocity component of the fluid as it passes through said metering rotor, the blading of said counter-rotating rotor being identical to that of said metering rotor with the exception that the blade angle of said counter-rotating rotor is equal and opposite to that of the blades of said metering rotor to produce in the fluid stream leaving said counter-rotating rotor a tangential velocity component having a magnitude equal and opposite to said predetermined change in said tangential velocity component imparted by said metering rotor, the blading of said rotors both having means to impart an angle to the fluid leaving each rotor that is substantially equal to the blade outlet angle of each rotor, and means for journalling said counter-rotating rotor in predetermined axially spaced relationship to said metering rotor to provide for a space between said rotors which is axially sufficiently short that the tangential velocity component produced in the fluid stream leaving the counter-rotating rotor remains substantially of the same magnitude when it enters said metering rotor and which is sufficiently axially long that the effect of the disturbance created by rotation of said counter-rotating rotor has negligible effect on the tangential velocity component of the fluid stream as it enters the metering rotor.

References Cited by the Examiner
UNITED STATES PATENTS
2,724,967   11/1955   Gehre _____ 72—230
FOREIGN PATENTS
14,060   4/1852   Great Britain.

RICHARD C. QUEISSER, Primary Examiner.
E. D. GILHOOLY, Assistant Examiner.